(12) United States Patent
Dalmatov et al.

(10) Patent No.: US 11,461,250 B2
(45) Date of Patent: Oct. 4, 2022

(54) TUNING DATA STORAGE EQUIPMENT BASED ON COMPARING OBSERVED I/O STATISTICS WITH EXPECTED I/O STATISTICS WHICH ARE DEFINED BY OPERATING SETTINGS THAT CONTROL OPERATION

(71) Applicant: EMC IP Holding Company LLC, Hopkinton, MA (US)

(72) Inventors: Nickolay Alexandrovich Dalmatov, Saint Petersburg (RU); Kirill Alexsandrovich Bezugly, Saint-Petersburg (RU)

(73) Assignee: EMC IP Holding Company LLC, Hopkinton, MA (US)

( * ) Notice: Subject to any disclaimer, the term of this patent is extended or adjusted under 35 U.S.C. 154(b) by 936 days.

(21) Appl. No.: 16/097,759

(22) PCT Filed: Oct. 26, 2017

(86) PCT No.: PCT/RU2017/000789
§ 371 (c)(1),
(2) Date: Oct. 30, 2018

(87) PCT Pub. No.: WO2019/083391
PCT Pub. Date: May 2, 2019

(65) Prior Publication Data
US 2021/0224205 A1    Jul. 22, 2021

(51) Int. Cl.
*G06F 13/16* (2006.01)
*G06F 3/06* (2006.01)

(52) U.S. Cl.
CPC ........ *G06F 13/1668* (2013.01); *G06F 3/0611* (2013.01); *G06F 3/0659* (2013.01); *G06F 3/0689* (2013.01)

(58) Field of Classification Search
CPC .. G06F 13/1668; G06F 3/0659; G06F 3/0689; G06F 3/0611
See application file for complete search history.

(56) References Cited

U.S. PATENT DOCUMENTS 5,345,584 A    9/1994 Hill
5,734,861 A    3/1998 Cohn et al.
(Continued)

FOREIGN PATENT DOCUMENTS

RU        2235356         8/2004
WO      20160072971       5/2016

OTHER PUBLICATIONS

International Search Report and the Written Opinion from International Searching Authority (RU) for International Application No. PCT/RU2017/000789, dated Aug. 2, 2018, 8 pages.
(Continued)

*Primary Examiner* — Idriss N Alrobaye
*Assistant Examiner* — Brooke J Taylor
(74) *Attorney, Agent, or Firm* — BainwoodHuang (57) ABSTRACT

A technique is directed to performing a tuning operation in data storage equipment. The technique involves generating, while the data storage equipment performs input/output (I/O) transactions, an observed I/O statistics profile based on performance of at least some of the I/O transactions. The technique further involves performing a comparison operation that compares the observed I/O statistics profile to an expected I/O statistics profile which is defined by a set of operating settings that controls operation of the data storage equipment. The technique further involves operating the data storage equipment in a normal state when a result of the comparison operation indicates that the observed I/O statistics profile matches the expected I/O statistics profile and in a remedial state which is different from the normal state when the result of the comparison operation indicates that (Continued)

the observed I/O statistics profile does not match the expected I/O statistics profile.

14 Claims, 5 Drawing Sheets

(56) References Cited

U.S. PATENT DOCUMENTS

| | | | |
|---|---|---|---|
| 6,173,306 B1 | 1/2001 | Raz et al. | |
| 8,051,219 B2 * | 11/2011 | Yamaguchi | G06F 3/0631 |
| | | | 710/18 |
| 8,706,960 B1 | 4/2014 | Ives et al. | |
| 8,935,493 B1 | 1/2015 | Dolan et al. | |
| 9,311,002 B1 | 4/2016 | Scott et al. | |
| 9,330,105 B1 | 5/2016 | Duprey et al. | |
| 9,383,940 B1 | 7/2016 | Ives et al. | |
| 9,594,514 B1 | 3/2017 | Bono et al. | |
| 9,684,593 B1 | 6/2017 | Chen et al. | |
| 9,703,664 B1 | 7/2017 | Alshawabkeh et al. | |
| 9,940,033 B1 | 4/2018 | Alshawabkeh et al. | |
| 9,965,218 B1 | 5/2018 | Martin et al. | |
| 10,025,523 B1 | 7/2018 | Dagan et al. | |
| 10,073,621 B1 | 9/2018 | Foley et al. | |
| 10,078,569 B1 | 9/2018 | Alshawabkeh et al. | |
| 10,089,026 B1 | 10/2018 | Puhov et al. | |
| 10,095,425 B1 | 10/2018 | Martin | |
| 10,126,988 B1 | 11/2018 | Han et al. | |
| 10,140,041 B1 | 11/2018 | Dong et al. | |
| 10,146,447 B1 | 12/2018 | Dong et al. | |
| 10,146,456 B1 | 12/2018 | Gao et al. | |
| 10,146,459 B1 | 12/2018 | Gao et al. | |
| 10,146,624 B1 | 12/2018 | Gong et al. | |
| 10,146,646 B1 | 12/2018 | Foley et al. | |
| 10,152,254 B1 | 12/2018 | Kang et al. | |
| 2003/0065883 A1 | 4/2003 | Bachmat | |
| 2006/0161807 A1 | 7/2006 | Dawkins | |
| 2006/0212746 A1 | 9/2006 | Amegadzie et al. | |
| 2006/0282709 A1 * | 12/2006 | Shu | G06F 11/0775 |
| | | | 714/100 |
| 2008/0028164 A1 | 1/2008 | Ikemoto et al. | |
| 2008/0059749 A1 | 3/2008 | Gerber et al. | |
| 2008/0109601 A1 | 5/2008 | Klemm et al. | |
| 2008/0114931 A1 * | 5/2008 | Aoki | G06F 11/3447 |
| | | | 711/114 |
| 2010/0250501 A1 | 9/2010 | Mandagere et al. | |
| 2012/0259901 A1 | 10/2012 | Lee et al. | |
| 2013/0275653 A1 | 10/2013 | Ranade et al. | |
| 2014/0095439 A1 | 4/2014 | Ram | |
| 2015/0134926 A1 | 5/2015 | Yang et al. | |
| 2016/0188401 A1 | 6/2016 | Shen et al. | |
| 2016/0364149 A1 | 12/2016 | Klemm et al. | |
| 2017/0285972 A1 | 10/2017 | Dalmatov | |

OTHER PUBLICATIONS

EMC, "EMC Celerra Automated Storage Tiering Applied Best Practices Guide", Aug. 2009, P/N h6499, pp. 1-36.
EMC, "EMC VNX@ Unified Best Practices for Performance Applied Best Practice Guide", Oct. 2005, P/N H10938.8, pp. 1-37.
EMC, "Managing Data Relocation in Storage Systems", U.S. Appl. No. 13/929,664, filed Jun. 27, 2013.
Tomek, "EMC VNX—Fast VP Explained—Storage Freak", retrieved from http://www.storagefreak.net/2014/06/emc-vnx-fast-vp-explained, Jun. 2, 2014, pp. 1-6.

* cited by examiner

TUNING DATA STORAGE EQUIPMENT BASED ON COMPARING OBSERVED I/O STATISTICS WITH EXPECTED I/O STATISTICS WHICH ARE DEFINED BY OPERATING SETTINGS THAT CONTROL OPERATION

BACKGROUND

Conventional data storage systems manage host data within storage devices on behalf of host computers. During operation, the host computers send input/output (I/O) requests to the data storage systems to store host data in, and retrieve host data from, the storage devices.

Some conventional data storage systems provide specialized storage services. For example, one conventional data storage system stores host data in accordance with Redundant Array of Independent Drive (RAID) Level 1 or simply RAID 1 (i.e., disk mirroring). Another conventional data storage system stores host data in accordance with RAID 5 (i.e., block level striping with distributed parity). Yet another conventional data storage system stores host data among different tiers of storage devices using a policy of placing the host data on the available tier of storage devices that provides the fastest performance, and so on.

SUMMARY

It should be understood that there are deficiencies to the above-described conventional data storage systems. In particular, one should appreciate that different host applications may provide different behaviors. For example, a surveillance application that captures video may tend to provide a large number of sequential writes and very few reads. As another example, a data warehousing application may store a large amount of data that may not be accessed very frequently, but may require a reliable fault tolerance scheme to prevent data loss. As yet another example, an online transaction processing (OLTP) application may access relatively small amounts of data, but may require fast response time.

Furthermore, one should appreciate that human users typically customize the configuration of storage resources of conventional data storage systems by manually selecting particular storage services for the data storage systems. In particular, the human users may try to match expected application behaviors with storage services that are favorable to those behaviors.

Unfortunately, the expected application behaviors may differ from the actual application behaviors. In such situations, the particular configurations of storage resources that the human users select as being favorable to the expected application behaviors may in reality be unfavorable to the actual application behaviors.

For example, suppose that a particular data storage system that provides tiered storage is expected to primarily run a data warehousing application that stores a large amount of information but that is accessed relatively infrequently. In such a situation, the human user may configure the data storage system to apply a tiering policy that prefers placing host data on the most cost effective storage tier, e.g., a low performance tier with a very large storage capacity. Further suppose that the actual usage pattern for the data warehousing application more closely resembles that of OLTP where the majority of operations access data in small amounts and require faster response time. Unfortunately, if the host data is placed on a low performance tier as configured by the human user, the data storage system operations will take longer due to misalignment between the actual application behavior with the current tiering policy.

In another example, suppose that a particular data storage system is expected to store information in a fault tolerant manner. In particular, suppose that the human user of the data storage system configures the data storage system to provide RAID 6, i.e., block-level striping with two parity blocks. However, further suppose that the particular storage system is assigned to record video feeds for a surveillance system. Unfortunately, although RAID 6 may provide sufficient fault tolerance to safeguard the recorded video feeds, RAID 6 is particularly compute intensive and a selection of RAID 1 (i.e., data mirroring) may have been a better choice, particularly in order to accommodate long sequential write operations by the surveillance system.

In such misaligned situations, data storage system performance may suffer. Furthermore, the reputation of the data storage system manufacturers and/or service providers may suffer since customers may view the poor performance as deficiencies in quality of the hardware and/or software rather than simple misalignment between actual application behavior and selected services.

In contrast to the above-described conventional data storage systems that are vulnerable to misalignments between actual application behavior and selected services, improved techniques are directed to tuning data storage equipment based on comparing observed I/O statistics with expected I/O statistics which are defined by operating settings that control operation of the data storage equipment. In the event of a mismatch between the observed I/O statistics and the expected I/O statistics, the data storage equipment may perform a remedial operation such as automatically adjust one or more operating settings, e.g., change a tiering policy, change to a different RAID Level, activate/deactivate prefetching, adjust to a different compression scheme, activate/deactivate deduplication, combinations thereof, and so on. Along these lines, evaluation of matches between observed I/O statistics and the expected I/O statistics may include gathering and analyzing a variety of different information such as random access and sequential access measurements, assessing the distribution and average size of accessed data, ascertaining the ratio between read operations and write operations, combinations thereof, and so on.

One embodiment is directed to a method of performing a tuning operation in a data storage system. The method includes generating, while the data storage equipment performs input/output (I/O) transactions, an observed I/O statistics profile based on performance of at least some of the I/O transactions. The method further includes performing a comparison operation that compares the observed I/O statistics profile to an expected I/O statistics profile which is defined by a set of operating settings that controls operation of the data storage equipment. The method further includes operating the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile.

In some arrangements, generating the observed I/O profile includes gathering, during a period of time, I/O measurements in response to performance of the I/O transactions on behalf of a set of host computers. In these arrangements, generating the observed I/O profile may further include deriving the observed I/O statistics profile from the I/O measurements gathered during the period of time.

In some arrangements, the method further includes, prior to performing the comparison operation, extrapolating the expected I/O statistics profile from the set of operating settings that controls operation of the data storage equipment.

In some arrangements, the observed I/O statistics profile includes a set of observed I/O statistics. Additionally, the expected I/O statistics profile includes a set of expected I/O statistics. Furthermore, performing the comparison operation includes providing, as the result of the comparison operation, (i) a first comparison indication when the set of observed I/O statistics matches the set of expected I/O statistics within a set of predefined thresholds, and (ii) a second comparison indication that is different from the first comparison indication when the set of observed I/O statistics does not match the set of expected I/O statistics within the set of predefined thresholds.

In some arrangements, the set of observed I/O statistics includes an observed sequentialness/randomness statistic indicating a sequentialness/randomness measurement of the I/O transactions. Additionally, the set of expected I/O statistics includes an expected sequentialness/randomness statistic indicating a sequentialness/randomness prediction for the I/O transactions. Furthermore, performing the comparison operation further includes comparing the observed sequentialness/randomness statistic to the expected sequentialness/randomness statistic to generate at least a portion of the result of the comparison operation.

In some arrangements, the set of observed I/O statistics includes an observed data access size statistic indicating a data access size measurement of the I/O transactions. Additionally, the set of expected I/O statistics includes an expected data access size statistic indicating a data access size prediction for the I/O transactions. Furthermore, performing the comparison operation further includes comparing the observed data access size statistic to the expected data access size statistic to generate at least a portion of the result of the comparison operation.

In some arrangements, the set of observed I/O statistics includes an observed read/write ratio statistic indicating a read/write ratio measurement of the I/O transactions. Additionally, the set of expected I/O statistics includes an expected read/write ratio statistic indicating a read/write ratio prediction for the I/O transactions. Furthermore, performing the comparison operation further includes comparing the observed read/write ratio statistic to the expected read/write ratio statistic to generate at least a portion of the result of the comparison operation.

In some arrangements, operating the data storage equipment includes, in response to the second comparison indication, transitioning the data storage equipment from the normal state to the remedial state.

In some arrangements, operating the data storage equipment includes, after transitioning the data storage equipment from the normal state to the remedial state, adjusting the set of operating settings that controls operation of the data storage equipment.

In some arrangements, the data storage equipment initially applies a first LUN level tiering policy. Additionally, adjusting the set of operating settings includes, based on the second comparison indication, applying a second LUN level tiering policy in place of the first LUN level tiering policy.

In some arrangements, the data storage equipment initially stores host data on behalf of the set of host computers in accordance with a first Redundant Array of Independent Drives (RAID) Level. Additionally, adjusting the set of operating settings includes, based on the second comparison indication, storing the host data on behalf of the set of host computers in accordance with a second RAID Level in place of the first RAID Level.

In some arrangements, the method further includes, during another period of time after the period of time and while the data storage equipment performs further I/O transactions, generating another I/O statistics profile. The method further includes performing another comparison operation that compares the other I/O statistics profile to the expected I/O statistics profile which is defined by the set of operating settings that controls operation of the data storage equipment. The method further includes transitioning the data storage equipment from the normal state to the remedial state in response to a result of the other comparison operation indicating that the other I/O statistics profile does not match the expected I/O statistics profile.

In some arrangements, the method further includes, in response to transitioning the data storage equipment from the normal state to the remedial state, providing an alert indicating misalignment between the I/O transaction and the set of operating settings that controls operation of the data storage equipment.

Another embodiment is directed to data storage equipment which includes a communications interface, memory, and control circuitry coupled to the communications interface and the memory. The memory stores instructions which, when carried out by the control circuitry, cause the control circuitry to:

(A) while the data storage equipment performs input/output (I/O) transactions in response to I/O requests received through the communications interface, generate an observed I/O statistics profile based on performance of at least some of the I/O transactions, (B) perform a comparison operation that compares the observed I/O statistics profile to an expected I/O statistics profile which is defined by a set of operating settings stored in the memory, the set of operating settings controlling operation of the data storage equipment, and (C) operate the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile.

Yet another embodiment is directed to a computer program product having a non-transitory computer readable medium which stores a set of instructions to perform a tuning operation on data storage equipment. The set of instructions, when carried out by computerized circuitry, causing the computerized circuitry to perform a method of:

(A) while the data storage equipment performs input/output (I/O) transactions, generating an observed I/O statistics profile based on performance of at least some of the I/O transactions;

(B) performing a comparison operation that compares the observed I/O statistics profile to an expected I/O statistics profile which is defined by a set of operating settings that controls operation of the data storage equipment; and (C) operating the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile.

It should be understood that, in the cloud context, at least some of electronic circuitry is formed by remote computer resources distributed over a network. Such an electronic environment is capable of providing certain advantages such as high availability and data protection, transparent operation and enhanced security, big data analysis, etc.

Other embodiments are directed to electronic systems and apparatus, processing circuits, computer program products, and so on. Some embodiments are directed to various methods, electronic components and circuitry which are involved in tuning data storage equipment based on comparing observed I/O statistics with expected I/O statistics which are defined by operating settings that control operation of the data storage equipment.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

DETAILED DESCRIPTION

An improved technique is directed to tuning data storage equipment based on comparing observed input/output (I/O) statistics with expected I/O statistics which are defined by operating settings that control operation of the data storage equipment. In the event of a mismatch between the observed I/O statistics and the expected I/O statistics, the data storage equipment may perform a set of remedial operations such as automatically adjust one or more operating settings, e.g., change a tiering policy, change to a different Redundant Array of Independent Drives (RAID) Level, activate/deactivate prefetching, adjust to a different compression scheme, activate/deactivate deduplication, combinations thereof, and so on. Evaluation of matches between the observed I/O statistics and the expected I/O statistics may include gathering and analyzing a variety of different information such as random access and sequential access measurements, assessing the distribution and average size of accessed data, ascertaining the ratio between read operations and write operations, combinations thereof, and so on.

Figure 1:
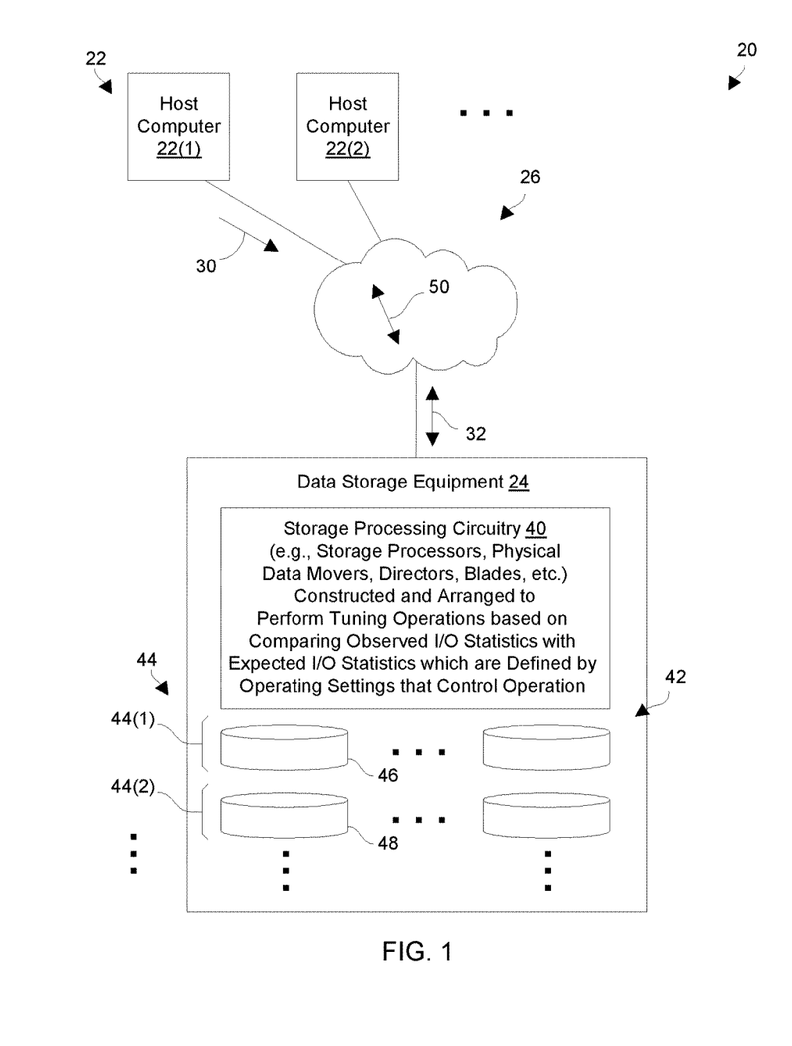
FIG. 1 is a block diagram of a data storage environment which enables effective tuning of data storage equipment.

FIG. 1 shows a data storage environment 20 which enables effective tuning of data storage equipment in accordance with certain example embodiments. The data storage environment 20 includes a set of host computers 22(1), 22(2), . . . (collectively, host computers 22), data storage equipment 24, and a communications medium 26.

The host computers 22 are constructed and arranged to perform useful work. Along these lines, each host computer 22 may run a particular application or a set of applications that provides a certain pattern of behavior. Along these lines, the host computers 22 may operate as web servers, file servers, email servers, enterprise servers, financial/banking centers, surveillance systems, combinations thereof, and so on, which provides I/O requests 30 to the data storage equipment 24 when accessing host data 32. Accordingly, certain host computers 22 may read and write host data 32 in small amounts and require fast access as in an online transaction processing (OLTP) data center. Additionally, certain host computers 22 may read and write host data 32 infrequently and not require fast access as in a data warehousing facility. Furthermore, certain host computers 22 may have a tendency for more write operations than read operations and tend to provide data in the form of a series of sequential writes as in a surveillance system that records streaming video, and so on.

The data storage equipment 24 includes storage processing circuitry 40 and a data storage array 42. In some arrangements, the data storage array 42 includes different data storage tiers 44(1), 44(2), . . . (collectively, storage tiers 44) formed of different types of data storage media. The storage processing circuitry 40 may include one or more physical storage processors or engines, data movers, director boards, blades, I/O modules, storage drive controllers, switches, other hardware, combinations thereof, and so on. The storage processing circuitry 40 is constructed and arranged to provide a variety of data storage system services. For example, the storage processing circuitry 40 may perform core operation such as writing host data 32 to and reading host data 32 from logical units of storage (LUNs) within the array 42. Additionally, based on a set of changeable operating settings, the storage processing circuitry 40 may perform enhanced operations on the LUNs such as apply a tiering policy, perform prefetching, implement particular RAID Levels, perform compression, perform deduplication, and so on.

In should be understood that, in the context of a hybrid array 42, each data storage tier 44 includes multiple storage devices (illustrated using disk symbols in FIG. 1). Although only two storage tiers 44 are shown in FIG. 1 for simplicity, it should be understood that the hybrid array 42 may include a different number of storage tiers 44 (e.g., three, four, etc.). Furthermore, the storage devices that form such tiers 44 may differ in terms of architecture (e.g., single-level cell solid state drives or SSDs, multi-level cell SSDs, magnetic disk, etc.), speed (e.g., 7200 RPM, 10,000 RPM, etc.), usage/adapter category (e.g., SAS, NL-SAS, etc.), storage capacity, power consumption, RAID Level, and so on.

In accordance with certain embodiments, at least one data storage tier 44 (e.g., the data storage tier 44(1)) includes a set of SSD storage components 46. Each SSD storage component 46 includes at least one SSD device (or simply SSD) that provides fast access to non-volatile storage. One should appreciate that such SSD storage is generally faster (i.e., shorter response times when reading and/or writing data) but typically more expensive than hard disk drive (HDD) storage.

Additionally, in accordance with certain embodiments, at least one data storage tier 44 (e.g., the data storage tier 44(2)) includes a set of HDD storage components 48. Each HDD storage component 48 includes at least one HDD device (or simply HDD) that provides access to non-volatile storage.

One should appreciate that such HDD storage is generally slower (i.e., longer response times when reading and/or writing data) but typically less expensive than SSD storage.

The various storage tiers 44 contribute slice locations (i.e., uniformly sized areas to store data) to heterogeneous pools of storage slices. That is, each heterogeneous pool includes storage slices formed by different types of storage media such as storage slices formed by SSD memory as well as storage slices formed by HDD memory.

According, in the context of a hybrid array 42, the storage processing circuitry 40 of the data storage equipment 24 is able to provision the LUNs with storage slices from the heterogeneous pools. Furthermore, the storage processing circuitry 40 is able to perform data placement and relocation within the LUNs in accordance with various LUN level policies (e.g., based on preferences for access times, storage capacities, etc.) as well as other services (e.g., compression, deduplication, etc.).

The communications medium 26 is constructed and arranged to connect the various components of the data storage environment 20 together to enable these components to communicate via exchanging electronic signals 50 (e.g., see the double arrow 50). At least a portion of the communications medium 26 is illustrated as a cloud to indicate that the communications medium 26 is capable of having a variety of different topologies including backbone, hub-and-spoke, fabric, loop, irregular, combinations thereof, and so on. Along these lines, the communications medium 26 may include copper-based data communications devices and cabling, fiber optic communications devices and cabling, wireless communication devices, combinations thereof, etc. Furthermore, the communications medium 26 is capable of supporting SAN-based communications, NAS-based communications, cellular communications, WAN-based communications, LAN-based communications, distributed infrastructure communications, other topologies, combinations thereof, etc.

During operation, the storage processing circuitry 40 of the data storage equipment 24 manages host data 32 on behalf of the host computers 22. During such operation, the storage processing circuitry 40 routinely performs tuning operations based on comparisons between observed I/O statistics and expected I/O statistics which are defined by a set of operating settings that controls operation of the data storage equipment. As a result, the storage processing circuitry 40 is able to maintain a match between the demands of host applications that access the data storage equipment 24 and the current configuration of the data storage equipment 24.

Moreover, if the storage processing circuitry 40 detects misalignment between host application behavior and the current configuration of the data storage equipment 24, the storage processing circuitry 40 is capable of automatically adjusting the set of operating settings that controls operation of the data storage equipment to more closely match the operation of the data storage equipment 24 to the host application behavior. In particular, the storage processing circuitry 40 may transition from a normal state to a remedial state in which the storage processing circuitry 40 performs one or more remedial activities. Suitable tuning operations include activating or deactivating data compression, migrating data from RAID 6 to RAID 1, activating or deactivating prefetching, among others. In some arrangements, the storage processing circuitry 40 may provide an alert to a human operator and/or require human operator approval before adjusting a particular operating parameter.

It should be understood that such matching between host application behavior and the configuration of data storage resources may be performed on a per LUN basis. That is, the storage processing circuitry 40 may align operation of a first LUN with a first application that accesses that first LUN, operation of a second LUN with a second application that accesses that second LUN, and so on. Further details will now be provided with reference to FIG. 2.

Figure 2:
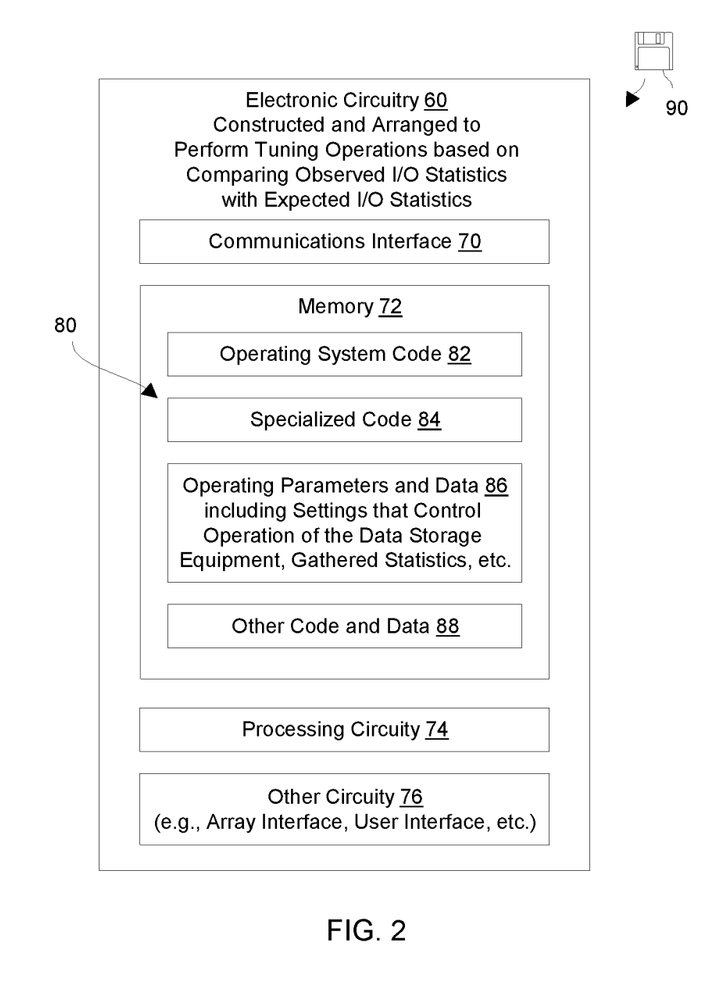
FIG. 2 is a block diagram of data storage equipment of the data storage environment of FIG. 1 in accordance with certain example embodiments.

FIG. 2 shows electronic circuitry 60 which is suitable for the storage processing circuitry 40 that performs tuning operations based on comparing observed I/O statistics with expected I/O statistics (also see FIG. 1). As shown in FIG. 2, the electronic circuitry 60 includes a communications interface 70, memory 72, processing circuitry 74, and other circuitry 76.

The communications interface 70 is constructed and arranged to connect the data storage equipment 24 to the communications medium 26 (FIG. 1) to enable electronic communications with other devices of the data storage environment 20 (e.g., the host computers 22). Such communications may be IP-based, SAN-based, cellular-based, cable-based, fiber-optic based, wireless, cloud-based, combinations thereof, and so on. Accordingly, the communications interface 70 enables the data storage equipment 24 to robustly and reliably communicate with other apparatus.

The memory 72 is intended to represent both volatile storage (e.g., DRAM, SRAM, etc.) and non-volatile storage (e.g., flash memory, magnetic memory, etc.). The memory 72 stores a variety of software constructs 80 including operating system code 82, specialized code 84, operating parameters and data 86, as well as other code and data 88. In some arrangements, the memory 72 utilizes a portion of the array 42 (FIG. 1).

The operating system code 82 refers to an operating system which is involved in controlling various electronic resources of the data storage equipment 24. Along these lines, the operating system manages/allocates various electronic resources such as processor cycles, memory space, application installations, access control and privileges, and so on.

The specialized code 84 refers to the instructions that are involved in performing data storage operations (e.g., writing and reading host data 32) as well as other operations such as deduplication, compression, and so on. The specialized code 84 may include operating variables and data structures, drivers, other metadata, etc. that form one or more portions of the I/O stack, mapping tables, and so on. In some arrangements, the specialized code 84 is tightly integrated with or forms a portion of the operating system code 82 (e.g., a kernel).

The operating parameters and data 86 refer to a variety of settings, policies, logged events, instructions, parameters, thresholds, rules for improving performance under different predefined conditions, other data, and so on. Along these lines, the operating parameter 86 may dictate particular LUN level policies, LUN configurations, LUN states, etc. As will be explained in further detail shortly, the operating parameters and data 86 includes an operating settings database and a gathered statistics repository. The operating settings database enables generation of an expected I/O statistics profile that defines expected I/O behavior. Similarly, the gathered statistics repository enables generation of an observed I/O statistics profile that defines observed I/O behavior which can be compared with the expected I/O statistics profile to determine whether the current configuration for the data storage equipment 24 is well aligned with actual application behavior. Moreover, in the event of a detected mismatch, the operating parameters and data 86 includes rules that enable adjustments to the settings to improve alignment between actual application behavior and configuration of data storage resources.

The other code and data 88 refers to various other data, etc. For example, the electronic circuitry 60 may be equipped with other tools and utilities, user-level applications, and so on.

The processing circuitry 74 is constructed and arranged to operate in accordance with the various software constructs 80 stored in the memory 72. As will be explained in further detail shortly, the processing circuitry 74 executes code of the various software constructs 80 to form specialized circuitry that concurrently carries out data storage operations as well as tuning operations.

Such processing circuitry 74 may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software constructs 80 to the electronic circuitry 60. In particular, the computer program product 90 has a non-transitory (or non-volatile) computer readable medium which stores a set of instructions which controls one or more operations of the electronic circuitry 60. Examples of suitable computer readable storage media include tangible articles of manufacture and apparatus which store instructions in a non-volatile manner such as CD-ROM, DVD, flash memory, disk memory, tape memory, and the like.

The other circuitry 76 represents additional hardware. For example, the other circuitry 76 may include a storage drive (or array) interface to communicate with the SSDs, HDDs, and so on (e.g., via SATA, SAS, PCIe, etc.). As another example, the other circuitry 76 may include a user terminal or service processor that enables a human user to control and/or configure the data storage equipment 24, and so on. Further details will now be provided with reference to FIGS. 3 and 4.

Figure 3:
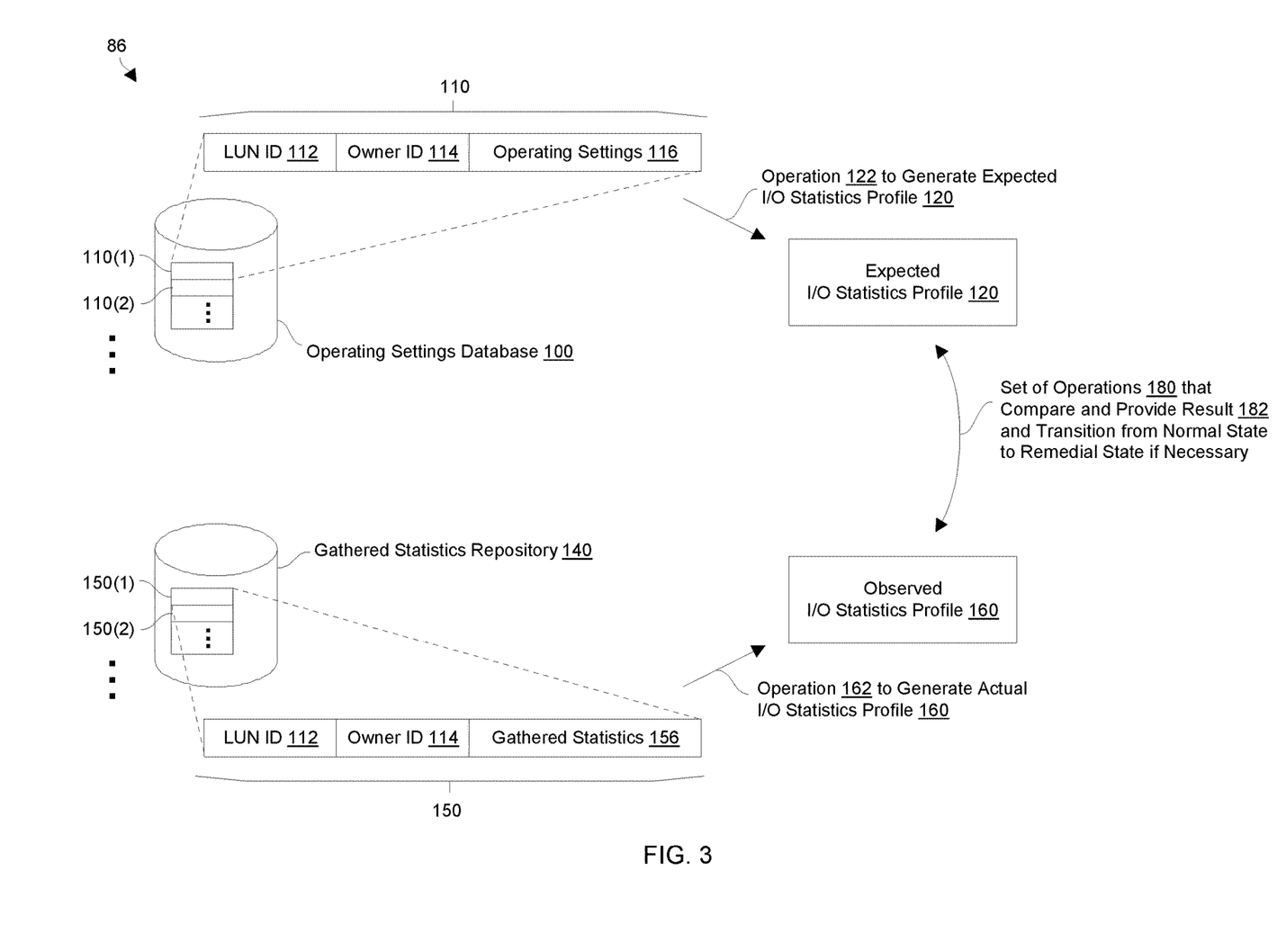
FIG. 3 is a block diagram illustrating particular tuning details of the data storage environment in accordance with certain example embodiments.
Figure 4:
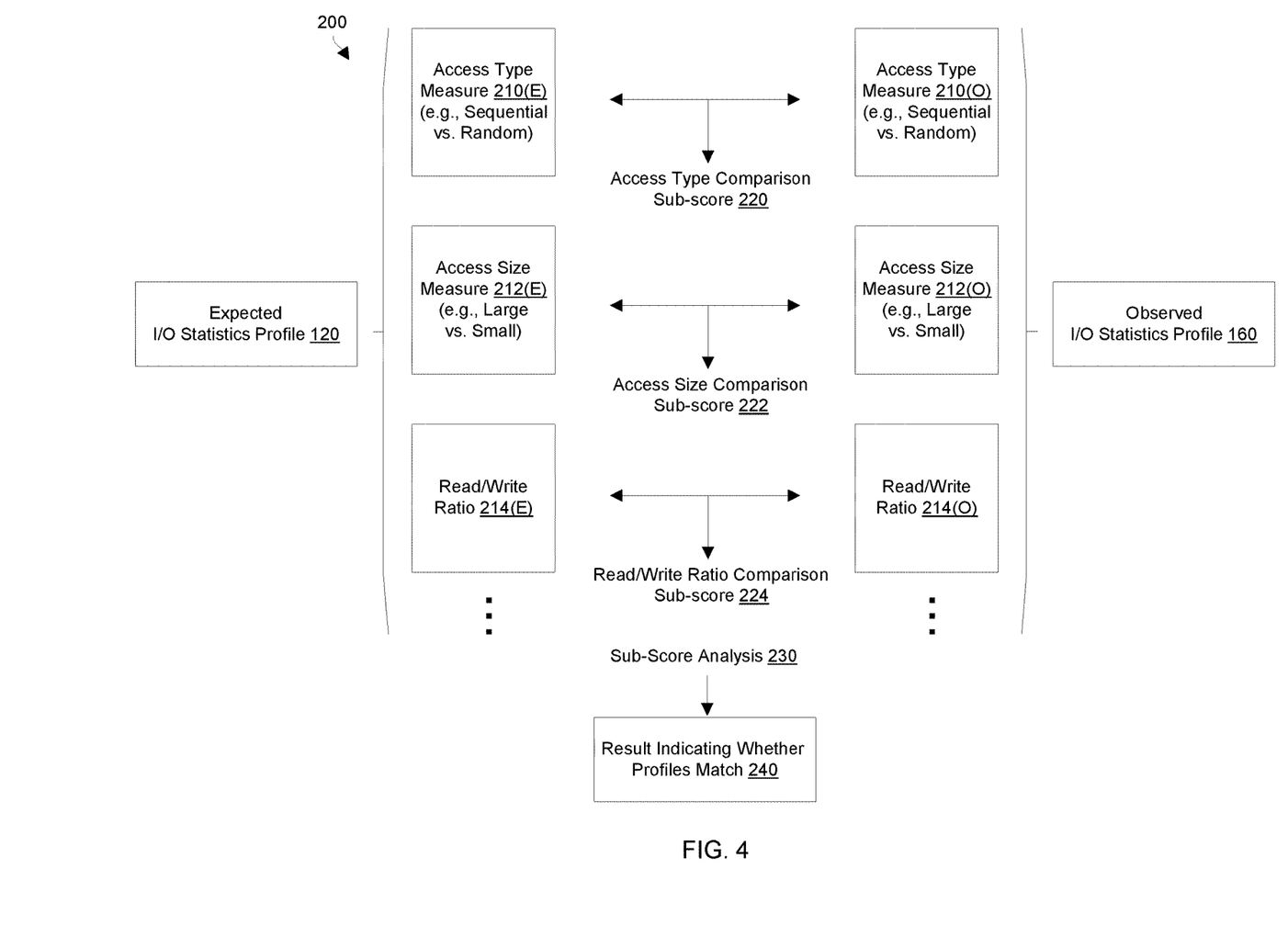
FIG. 4 is a block diagram illustrating further tuning details of the data storage environment in accordance with certain example embodiments.

FIGS. 3 and 4 show particular tuning details of the data storage equipment 24 in accordance with certain example embodiments. FIG. 3 shows how I/O statistics profiles are generated from information within the operating parameters and data 86 (also see FIG. 2). FIG. 4 shows particular data within the I/O statistics profiles and how that data is compared.

As shown in FIG. 3 and as mentioned earlier, the operating parameters and data 86 includes an operating settings database 100 that stores operating settings which control operation of the data storage equipment 24. In particular, the operating settings database 100 includes multiple operating setting entries 110(1), 110(2), . . . (collectively, operating setting entries 110). Each operating setting entry 110 defines operating parameters for a particular LUN that is accessed by a particular host application (also see the host computers 22 in FIG. 1). That is, each operating setting entry 110 includes a LUN identifier (ID) field that holds a LUN ID 112 that uniquely identifies a LUN within the array 42, an owner ID field that holds an owner ID 114 that uniquely identifies an owner (e.g., one or more host computers 22) that accesses that LUN, and a set of operating setting fields that holds a set of operating settings 116 which controls operation of that LUN.

It should be understood that the set of operating settings 116 within each operating setting entry 110 may include a variety of parameters such as those that control data format (e.g., RAID 1, RAID 5, RAID 6, RAID 10, etc.), tiering policy (e.g., prefer the fastest available tier, prefer the lowest cost tier, other auto-tiering schemes, etc.), prefetching, type of compression if any, deduplication, and so on. The storage processing circuitry 40 then applies the set of operating settings 116 to the LUN that is identified by the LUN ID 112 within that operating setting entry 110.

It should be further understood that, from the set of operating settings 116 within each operating setting entry 110, the storage processing circuitry 40 is capable of deriving an expected I/O statistics profile 120. In particular, based on the particular setting values, the storage processing circuitry 40 performs an operation 122 to generate a set of expected I/O statistics such as tolerable levels for sequential or random write operations, sequential or random read operations, amounts (sizes) and distributions for write operations and read operations, an expected ratio for write operations to read operations, and so on. Such derivation may simply involve tabulating expected values from pre-defined metrics in a lookup table (e.g., where a particular tiering policy is appropriate for a certain range of access times, where a particular RAID Level is appropriate for a particular type of randomness and/or block size, etc.). In some arrangements, the storage processing circuitry 40 re-performs the operation 122 routinely in case one or more of the operating settings 116 is changed.

As further shown in FIG. 3 and as mentioned earlier, the operating parameters and data 86 includes gathered statistics repository 140 that stores statistics which the storage processing circuitry 40 gathers over time while performing actual I/O operations on behalf of the host computers 22. In particular, the gathered statistics repository 140 includes multiple gathered statistics entries 150(1), 150(2), . . . (collectively, gathered statistics entries 150). Each gathered statistics entry 150 includes a collection of gathered statistics for a particular LUN. That is, each gathered statistics entry 150 includes a LUN ID field that holds a LUN ID 112 that uniquely identifies a LUN within the array 42, an owner ID field that holds an owner ID 114 that uniquely identifies an owner that accesses that LUN, and a set of gathered statistics fields that holds a set of gathered statistics 156 collected during a period of operation of that LUN.

It should be understood that the set of gathered statistics 156 within each gathered statistics entry 150 may include, for a particular LUN identified by that entry 150, a variety of different statistics such as the numbers of sequential read and write operations performed over a recent period of time, the numbers of random read and write operations performed over that period of time, the size of each data access, the degree of auto-tiering that was performed over that period of time, the amount of compression that took place over that period of time, the amount of deduplication that took place over that period of time, the frequency of cache hits or misses over that period of time, and so on.

It should be further understood that, from the set of gathered statistics 156 of an entry 150, the storage processing circuitry 40 is capable of deriving an expected I/O statistics profile 160 for the LUN identified by that entry 150. In particular, based on the gathered statistics 156, the storage processing circuitry 40 performs an operation 162 to generate a set of observed I/O statistics such as actual counts of sequential or random write operations, actual counts of sequential or random read operations, actual amounts and distributions for write operations and read operations, the actual ratio of write operations to read operations, and so on. In some arrangements, the storage processing circuitry 40 re-performs the operation 162 routinely in case the behavior of one or more host computers 22 access the LUN changes over time.

With both a current expected I/O statistics profile 120 and a current observed I/O statistics profile 160 available for comparison, the storage processing circuitry 40 performs a set of operations 180 that compares and provides a comparison result 182 indicating whether the set of observed I/O statistics profile 160 properly matches the expected I/O statistics profile 120 (e.g., whether the profiles 160, 120 match within a set of predefined thresholds or tolerances). That is, the comparison result 182 indicates whether the set of operating settings 116 for a particular LUN is appropriate for the current application(s) accessing that LUN.

If the comparison result 182 indicates that the observed I/O statistics profile 160 matches the expected I/O statistics profile 120 (e.g., within a set of predefined thresholds and/or tolerances), the current configuration of data storage resources is considered well-aligned with the current application behavior for that LUN. Accordingly, the storage processing circuitry 40 stays within a normal operating state, i.e., the storage processing circuitry 40 does not make any adjustments set of operating settings 116.

However, if the comparison result 182 indicates that the observed I/O statistics profile 160 does not match the expected I/O statistics profile 120 (e.g., within the set of predefined thresholds and/or tolerances), the current configuration of data storage resources is considered misaligned with the current application behavior for that LUN. In this situation, the storage processing circuitry 40 transitions from the normal operating state to a remedial state in which one or more of the operating settings 116 for that LUN may adjusted to improve alignment. Additionally (or alternatively), the storage processing circuitry 40 may alert a human operator or prompt the human operator for authorization to implement one or more adjustments.

In some arrangements, the storage processing circuitry 40 is provided with a set of predefined adjustments to make to improve data storage performance under certain scenarios (also see the operating parameters and data 86 in FIG. 2). Such adjustments may include, for that LUN, switching from the current RAID Level to RAID 1 if I/O operations are dominated by sequential write operations, switching from the current tiering policy to a new tiering policy that prefers placing hot data in the fasted tier if fast response time is critical, activating prefetching if the I/O operations involve sequentially reading large amounts of data, and so on.

It should be understood that this process continues in an ongoing manner. Accordingly, the storage processing circuitry 40 is able to adapt the operation of the data storage equipment 24 to changes in application behavior over time.

FIG. 4 shows, by way of example only, a variety of I/O criteria or metrics 200 that belong to the expected I/O statistics profile 120 and the observed I/O statistics profile 160 of a particular LUN. In particular, each I/O statistics profile 120, 160 includes multiple criteria related to application behavior. By way of example, the expected I/O statistics profile 120 includes an access type measure 210 (E), an access size measure 212(E), a read/write ration 214(E), and so on. Similarly, the observed I/O statistics profile 160 includes an access type measure 210(O), an access size measure 212(O), a read/write ration 214(O), and so on.

By way of example, the access type measures 210(E), 210(O) are measures indicating whether the majority of access operations are sequential or random. That is, the access type measure 210(E) is an expected measure (e.g., sequential vs. random) based on the current set of operating settings 116. Additionally, the access type measure 210(O) is an observed measure (e.g., sequential vs. random) based on the gathered statistics 156. It should be understood that other access type measures are suitable as well such as individual measures for read only, writes only, etc.

Also, by way of example, the access size measures 212(E), 212(O) are measures indicating whether the majority of access operations are large or small. That is, the access size measure 212(E) is an expected measure (e.g., large vs. small) based on the current set of operating settings 116. Additionally, the access size measure 212(O) is an observed measure (e.g., large vs. small) based on the gathered statistics 156. It should be understood that other access size measures are suitable as well such as measures for specific block sizes (e.g., 64 KB, 128 KB, 256 KB, etc.), and so on.

Furthermore, by way of example, the read/write ratios 214(E), 214(O) are measures indicating whether the distribution of reads and writes. That is, the read/write ratio 212(E) is an expected read/write ratio (e.g., more reads vs. more writes) based on the current set of operating settings 116. Additionally, the read/write ratio 214(O) is an observed measure (e.g., more reads vs. more writes) based on the gathered statistics 156. It should be understood that other read/write ratio metrics are suitable as well such as specific percentages (e.g., 20% reads, 30% reads, 20% writes, 30% writes, etc.), and so on.

As shown in FIG. 4, the storage processing circuitry 40 individually compares the I/O criteria 200 to provide respective sub-scores when evaluating the match between observed application behavior and current resource configuration for a particular LUN. For example, comparing the access type measures 210(E), 210(O) generates an access size comparison sub-score 220, comparing the access size measures 212(E), 212(O) generates an access size comparison sub-score 222, and comparing the read/write ratios 214(E), 214(O) generates a read/write ratio comparison sub-score 224, and so on. In some arrangements, such individual matching may include a tolerance or range factor (e.g., within 5%, within 10%, etc.).

Next, the storage processing circuitry 40 performs a sub-score analysis operation 230 that evaluates the subscores 220, 222, 224, .... Such analysis may involve adding the sub-scores together to generate an overall score and comparing the overall score to a threshold, weighting the sub-scores based on importance or emphasis, and so on. The storage processing circuitry 40 then outputs a result 240 indicating whether the profiles 120, 160 match for the particular LUN.

The result 240 indicates whether the storage processing circuitry 40 should maintain the data storage equipment 24 in the normal operating state or transition the data storage equipment 24 to the remedial state where the storage processing circuitry 40 adjusts the set of operating settings 116 for the particular LUN being evaluated. It should be understood that once the storage processing circuitry 40 has adjusted the set of operating settings 116, the storage processing circuitry 40 transitions the data storage equipment 24 back to the normal operating state for the particular LUN.

Along these lines and for the particular LUN, suppose that the data storage equipment 24 currently provides tiered storage and applies a tiering policy that prefers placing data on the most cost effective storage tier, e.g., a low performance tier with a very large storage capacity. Perhaps the operator of the data storage equipment 24 expected the host computer 22 to access the host data 32 in accordance with a traditional data warehousing application that stores a large amount of information but that is accessed relatively infrequently.

However, further suppose that the host computer 22 actually accesses the host data 32 in the particular LUN more like that of an online transaction processing (e.g., operations that access data in small amounts and that require response time). In such a situation, the storage processing circuitry 40 is able to detect the mismatch between actual application behavior and the current tiering policy and switch from a normal operating mode to a remedial operating mode. In some arrangements, the remedial operating mode switches the set of operating settings that controls operation of the data storage equipment to adjust the tiering policy to one that better matches the actual application behavior, e.g., auto-tiering that prefers placement of data in a high performance tier 44 to reduce latency. Other adjustments are suitable as well for the particular LUN such as changing RAID Level, turning compression on or off, etc.

In another example, suppose that data storage equipment 24 currently maintains a LUN using RAID 6, i.e., block-level striping with two parity blocks. Along these lines, the data storage equipment 24 may be tasked with recording video feeds for a surveillance system. However, further suppose that based on the above-described evaluation, the storage processing circuitry determines that the LUN is being inefficiently maintained and should be stored via RAID 1. In such a situation, the storage processing circuitry 40 may alter the set of operating settings 116 for that LUN and migrate the data to other storage (perhaps even another LUN) that implements RAID 1. Further details will now be provided with reference to FIG. 5.

Figure 5:
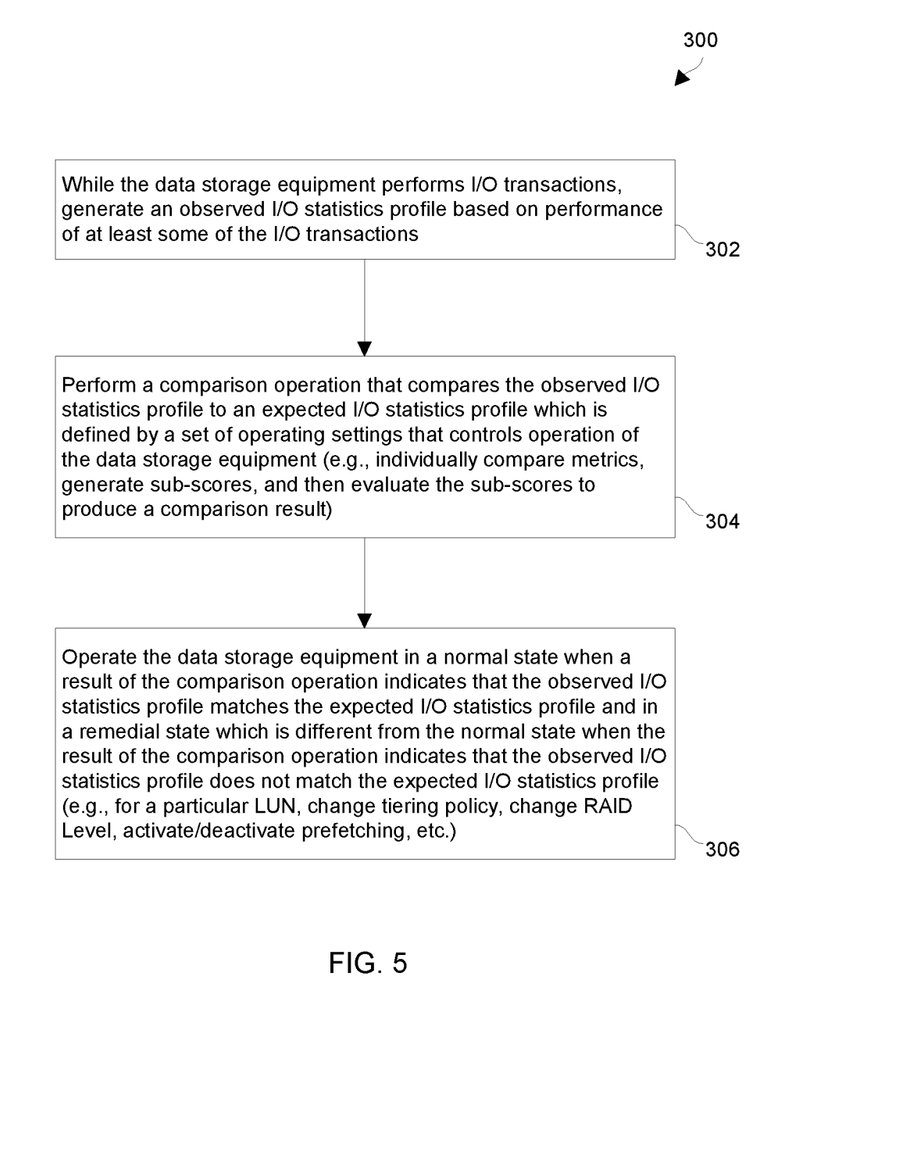
FIG. 5 is a flowchart of a procedure which is performed by the data storage equipment of FIG. 2.

FIG. 5 is a flowchart of a procedure 300 for performing a tuning operation in accordance with certain example embodiments. Such procedure 300 may be performed by control circuitry of data storage equipment (e.g., also see FIG. 1) on behalf of an application that accesses a particular LUN.

At 302, while the data storage equipment performs I/O transactions, the control circuitry generates an observed I/O statistics profile based on performance of at least some of the I/O transactions. Such activity may be performed periodically (e.g., hourly, daily, weekly, monthly, etc.).

At 304, the control circuitry performs a comparison operation that compares the observed I/O statistics profile to an expected I/O statistics profile which is defined by a set of operating settings that controls operation of the data storage equipment (also see FIGS. 3 and 4). Such a comparison may involve individual comparisons of expected and observed I/O metrics such as access type, access size, read/write ratio, and so on. In some arrangements, sub-scores are tabulated to produces an overall score indicating whether the profiles match.

At 306, the control circuitry operates the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile. If the profiles are determined to not match, the control circuitry may perform a tuning operation such as change a tiering policy, change a RAID Level, activate/deactivate prefetching, change a compression scheme, activate/deactivate deduplication, and so on. Such operation thus improves the match between application behavior to the particular LUN and the configuration of data storage resources that service that LUN.

As mentioned above, improved techniques are directed to tuning data storage equipment 24 based on comparing observed I/O statistics with expected I/O statistics which are defined by operating settings 116 that control operation of the data storage equipment 24. In the event of a mismatch between the observed I/O statistics and the expected I/O statistics, the data storage equipment 24 may perform a remedial operation such as automatically adjust one or more operating settings 116, e.g., change a tiering policy, change to a different RAID Level, activate/deactivate prefetching, adjust to a different compression scheme, activate/deactivate deduplication, combinations thereof, and so on. Along these lines, evaluation of matches between observed I/O statistics and the expected I/O statistics may include gathering and analyzing a variety of different information such as random access and sequential access measurements, assessing the distribution and average size of accessed data, ascertaining the ratio between read operations and write operations, combinations thereof, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components of the data storage environment 20 such as the host computers 22 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, the particular I/O profile statistics 200 that were listed in connection with FIG. 4 were provided by way of example only. Other metrics, combinations thereof, etc. are suitable for use as well.

One should appreciate that the above-described techniques do not merely manage data. Rather, the disclosed techniques involve improvements to the technology. Along these lines, with the above-described techniques, the data storage equipment 24 is able to implement more effective and efficient alignment of data storage operations (e.g., tiering policy, RAID Level, compression, etc.) with actual application behavior (e.g., random vs. sequential access, large vs. small block size, read/write preferences, etc.). In particular, the data storage equipment 24 is able to perform accurate matching, as well as adapting over time if the application behavior changes.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

One should appreciate that there is no exact information about what kind of application a human user is using to access a LUN within an array. Examples of applications include online analytical processing (OLAP), online transaction processing (OLTP), and data warehousing, among others. These different applications have different behaviors and thus different I/O profiles. Accordingly, the most appropriate data storage equipment configuration for one application may not be appropriate for another application.

Moreover, a human user may configure the storage resources incorrectly and thus experience poor performance. In such a situation, the human user may also blame the poor performance on the storage resources rather than incorrect configuration of the storage resources.

However, with the improvements disclosed herein, actual I/O statistics may be collected and analyzed systematically and thoroughly. In particular, circuitry generates an observed I/O statistics profile which is compared to an expected I/O statistics profile that is defined by operating settings of the equipment. Such profiles may include metrics such as the distribution of I/O sizes, read/write ratio, and randomness of accesses, among others.

With this available and in accordance with certain embodiments, the circuitry is able to check if the current configuration matches the best practices for the current application behavior. The circuitry may confirm that the storage resources and the current application are compatible with each other. Additionally, the circuitry may make adjustments to improve alignment of operation with the current application behavior. Furthermore, the circuitry may even warn the human user if there is a significant mismatch. Such modifications and enhancements are intended to belong to various embodiments of the disclosure.

What is claimed is:

1. In data storage equipment, a method of performing a tuning operation, the method comprising:
    while the data storage equipment performs input/output (I/O) transactions, generating an observed I/O statistics profile based on performance of at least some of the I/O transactions, wherein the observed I/O statistics profile includes a set of observed I/O statistics, wherein the set of observed I/O statistics includes (i) an observed sequentialness/randomness statistic indicating a sequentialness/randomness measurement of the I/O transactions, (ii) an observed data access size statistic indicating a data access size measurement of the I/O transactions, and (iii) an observed read/write ratio statistic indicating a read/write ratio measurement of the I/O transactions, and wherein generating the observed I/O profile includes:
    during a period of time, gathering I/O measurements in response to performance of the I/O transactions on behalf of a set of host computers, and deriving the observed I/O statistics profile from the I/O measurements gathered during the period of time;
    performing a comparison operation that compares the observed I/O statistics profile to an expected I/O statistics profile which is defined by a set of operating settings that controls operation of the data storage equipment, wherein the expected I/O statistics profile includes a set of expected I/O statistics, wherein the set of expected I/O statistics includes (i) an expected sequentialness/randomness statistic indicating a sequentialness/randomness prediction for the I/O transactions, (ii) an expected data access size statistic indicating a data access size prediction for the I/O transactions, and (iii) an expected data access size statistic indicating a data access size prediction for the I/O transactions, and wherein performing the comparison operation includes: comparing the observed sequentialness/randomness statistic to the expected sequentialness/randomness statistic to generate at least a portion of the result of the comparison operation, comparing the observed data access size statistic to the expected data access size statistic to generate at least a portion of the result of the comparison operation, comparing the observed read/write ratio statistic to the expected read/write ratio statistic to generate at least a portion of the result of the comparison operation, and providing, as the result of the comparison operation, (i) a first comparison indication when the set of observed I/O statistics matches the set of expected I/O statistics within a set of predefined thresholds, and (ii) a second comparison indication that is different from the first comparison indication when the set of observed I/O statistics does not match the set of expected I/O statistics within the set of predefined thresholds;
    operating the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile;
    and prior to performing the comparison operation, extrapolating the expected I/O statistics profile from the set of operating settings that controls operation of the data storage equipment.

2. A method as in claim 1 wherein operating the data storage equipment includes:
    in response to the second comparison indication, transitioning the data storage equipment from the normal state to the remedial state.

3. A method as in claim 2 wherein operating the data storage equipment includes: after transitioning the data storage equipment from the normal state to the remedial state, adjusting the set of operating settings that controls operation of the data storage equipment.

4. A method as in claim 3 wherein the data storage equipment initially applies a first LUN level tiering policy;
    and wherein adjusting the set of operating settings includes:
    based on the second comparison indication, applying a second LUN level tiering policy in place of the first LUN level tiering policy.

5. A method as in claim 3 wherein the data storage equipment initially stores host data on behalf of the set of host computers in accordance with a first Redundant Array of Independent Drives (RAID) Level;
    and wherein adjusting the set of operating settings includes:
    based on the second comparison indication, storing the host data on behalf of the set of host computers in accordance with a second RAID Level in place of the first RAID Level.

6. A method as in claim 1, further comprising:
    during another period of time after the period of time and while the data storage equipment performs further I/O transactions, generating another I/O statistics profile;

performing another comparison operation that compares the other I/O statistics profile to the expected I/O statistics profile which is defined by the set of operating settings that controls operation of the data storage equipment; and transitioning the data storage equipment from the normal state to the remedial state in response to a result of the other comparison operation indicating that the other I/O statistics profile does not match the expected I/O statistics profile.

7. A method as in claim 6, further comprising:

in response to transitioning the data storage equipment from the normal state to the remedial state, providing an alert indicating misalignment between the I/O transaction and the set of operating settings that controls operation of the data storage equipment.

8. Data storage equipment, comprising:

a communications interface;

memory; and control circuitry coupled to the communications interface and the memory, wherein the memory stores instructions which, when carried out by the control circuitry, cause the control circuitry to: while the data storage equipment performs input/output (I/O) transactions in response to I/O requests received through the communications interface, generate an observed I/O statistics profile based on performance of at least some of the I/O transactions, wherein the observed I/O statistics profile includes a set of observed I/O statistics, wherein the set of observed I/O statistics includes (i) an observed sequentialness/randomness statistic indicating a sequentialness/randomness measurement of the I/O transactions, (ii) an observed data access size statistic indicating a data access size measurement of the I/O transactions, and (iii) an observed read/write ratio statistic indicating a read/write ratio measurement of the I/O transactions, and wherein generating the observed I/O profile includes:

during a period of time, gathering I/O measurements in response to performance of the I/O transactions on behalf of a set of host computers, and deriving the observed I/O statistics profile from the I/O measurements gathered during the period of time;

perform a comparison operation that compares the observed I/O statistics profile to an expected I/O statistics profile which is defined by a set of operating settings stored in the memory, the set of operating settings controlling operation of the data storage equipment, wherein the expected I/O statistics profile includes a set of expected I/O statistics, wherein the set of expected I/O statistics includes (i) an expected sequentialness/randomness statistic indicating a sequentialness/randomness prediction for the I/O transactions, (ii) an expected data access size statistic indicating a data access size prediction for the I/O transactions, and (iii) an expected data access size statistic indicating a data access size prediction for the I/O transactions, and wherein performing the comparison operation includes:

comparing the observed sequentialness/randomness statistic to the expected sequentialness/randomness statistic to generate at least a portion of the result of the comparison operation, comparing the observed data access size statistic to the expected data access size statistic to generate at least a portion of the result of the comparison operation, comparing the observed read/write ratio statistic to the expected read/write ratio statistic to generate at least a portion of the result of the comparison operation, and providing, as the result of the comparison operation, (i) a first comparison indication when the set of observed I/O statistics matches the set of expected I/O statistics within a set of predefined thresholds, and (ii) a second comparison indication that is different from the first comparison indication when the set of observed I/O statistics does not match the set of expected I/O statistics within the set of predefined thresholds;

operate the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile; and prior to performing the comparison operation, extrapolate the expected I/O statistics profile from the set of operating settings that controls operation of the data storage equipment.

9. A computer program product having a non-transitory computer readable medium which stores a set of instructions to perform a tuning operation on data storage equipment;

the set of instructions, when carried out by computerized circuitry, causing the computerized circuitry to perform a method of:

while the data storage equipment performs input/output (I/O) transactions, generating an observed I/O statistics profile based on performance of at least some of the I/O transactions, wherein the observed I/O statistics profile includes (i) an observed sequentialness/randomness statistic indicating a sequentialness/randomness measurement of the I/O transactions, (ii) an observed data access size statistic indicating a data access size measurement of the I/O transactions, and (iii) an observed read/write ratio statistic indicating a read/write ratio measurement of the I/O transactions, and wherein generating the observed I/O profile includes: during a period of time, gathering I/O measurements in response to performance of the I/O transactions on behalf of a set of host computers, and deriving the observed I/O statistics profile from the I/O measurements gathered during the period of time;

performing a comparison operation that compares the observed I/O statistics profile to an expected I/O statistics profile which is defined by a set of operating settings that controls operation of the data storage equipment, wherein the expected I/O statistics profile includes (i) an expected sequentialness/randomness statistic indicating a sequentialness/randomness prediction for the I/O transactions, (ii) an expected data access size statistic indicating a data access size prediction for the I/O transactions, and (iii) an expected read/write ratio statistic indicating a read/write ratio prediction for the I/O transactions, and wherein performing the comparison operation includes:

comparing the observed sequentialness/randomness statistic to the expected sequentialness/randomness statistic to generate at least a portion of the result of the comparison operation, comparing the observed data access size statistic to the expected data access size statistic to generate at least a portion of the result of the comparison operation, comparing the observed read/write ratio statistic to the expected read/write ratio statistic to generate at least a portion of the result of the comparison operation, and providing, as the result of the comparison operation, (i) a first comparison indication when the set of observed I/O statistics matches the set of expected I/O statistics within a set of predefined thresholds, and (ii) a second comparison indication that is different from the first comparison indication when the set of observed I/O statistics does not match the set of expected I/O statistics within the set of predefined thresholds;

operating the data storage equipment in a normal state when a result of the comparison operation indicates that the observed I/O statistics profile matches the expected I/O statistics profile and in a remedial state which is different from the normal state when the result of the comparison operation indicates that the observed I/O statistics profile does not match the expected I/O statistics profile; and prior to performing the comparison operation, extrapolating the expected I/O statistics profile from the set of operating settings that controls operation of the data storage equipment.

10. A computer program product as in claim 9 wherein operating the data storage equipment includes:
in response to the result of the comparison operation, transitioning the data storage equipment from the normal state to the remedial state and adjusting the set of operating settings that controls operation of the data storage equipment.

11. A computer program product as in claim 10 wherein the data storage equipment initially applies a first LUN level tiering policy, wherein adjusting the set of operating settings includes:
based on the result of the comparison operation, applying a second LUN level tiering policy in place of the first LUN level tiering policy, wherein the data storage equipment initially stores host data on behalf of a set of host computers in accordance with a first Redundant Array of Independent Drives (RAID) Level, and wherein adjusting the set of operating settings further includes:
based on the result of the comparison operation, storing the host data on behalf of the set of host computers in accordance with a second RAID Level in place of the first RAID Level.

12. A method as in claim 1 wherein:
the at least some of the I/O transactions are I/O transactions that are aimed at a particular logical disk of a plurality of logical disks managed by the data storage equipment;

gathering I/O measurements includes gathering the I/O measurements from the I/O transactions that are aimed at the particular logical disk;

the set of operating settings controls operation of the particular logical disk;

operating the data storage equipment in the normal state includes operating the particular logical disk according to the set of operating settings; and operating the data storage equipment in the remedial state includes adjusting the set of operating settings that controls operation of the particular logical disk.

13. A method as in claim 12 wherein operating the data storage equipment in the remedial state further includes migrating the particular logical disk from a first set of storage drives to a second set of storage drives.

14. A method as in claim 12 wherein:
comparing the observed I/O statistics profile to the expected I/O statistics profile which is defined by the set of operating settings includes obtaining the set of operating settings from an operating settings database by keying into the operating settings database using an identifier of the particular logical disk, the operating settings database storing a plurality of sets of operating settings respectively keyed by respective identifiers of the plurality of logical disks;

and gathering I/O measurements in response to performance of the I/O transactions includes:
performing I/O measurements with respect to the I/O transactions that are aimed at the particular logical disk;
locating a gathered statistics field for the particular logical disk in a gathered statistics database by keying into the gathered statistics database using the identifier of the particular logical disk, the gathered statistics database storing a plurality of gathered statistics fields respectively keyed by respective identifiers of the plurality of logical disks, each gathered statistics field storing a set of I/O measurements for its respective logical disk; and
storing the performed I/O measurements within the located gathered statistics field for the particular logical disk; and
deriving the observed I/O statistics profile from the I/O measurements includes obtaining the I/O measurements from the gathered statistics database by keying into the gathered statistics database using the identifier of the particular logical disk.

* * * * *